United States Patent
Nishida

(10) Patent No.: US 8,791,748 B2
(45) Date of Patent: Jul. 29, 2014

(54) CHARGE PUMP CIRCUIT AND OPERATION CONTROL METHOD THEREOF

(75) Inventor: Junji Nishida, Neyagawa (JP)

(73) Assignee: Ricoh Company, Ltd., Tokyo (JP)

( * ) Notice: Subject to any disclaimer, the term of this patent is extended or adjusted under 35 U.S.C. 154(b) by 230 days.

(21) Appl. No.: 13/383,505

(22) PCT Filed: Jul. 22, 2010

(86) PCT No.: PCT/JP2010/062741
§ 371 (c)(1),
(2), (4) Date: Jan. 11, 2012

(87) PCT Pub. No.: WO2011/013727
PCT Pub. Date: Feb. 3, 2011

(65) Prior Publication Data
US 2012/0112724 A1    May 10, 2012

(30) Foreign Application Priority Data

Jul. 29, 2009    (JP) ................................ 2009-176197

(51) Int. Cl.
G05F 1/10    (2006.01)
G05F 3/02    (2006.01)
H02M 3/18    (2006.01)
H02M 7/00    (2006.01)

(52) U.S. Cl.
USPC ................................ 327/536; 363/59; 363/60

(58) Field of Classification Search
CPC ........... H02M 3/04; H02M 3/06; H02M 3/07; H02M 3/073; G11C 5/145; G11C 5/146; H01L 27/0222
USPC ............... 323/293; 363/59–62; 327/536, 537; 307/110, 109
See application file for complete search history.

(56) References Cited

U.S. PATENT DOCUMENTS 6,370,046 B1    4/2002    Nebrigic et al.
6,960,955 B2 *  11/2005   Nonaka .................... 327/536
(Continued)

FOREIGN PATENT DOCUMENTS

JP    56-12859     2/1981
JP    61-120933    6/1986
(Continued)

OTHER PUBLICATIONS

International Search Report in PCT/JP2010/062741, Oct. 26, 2010.
(Continued)

*Primary Examiner* — Timothy J Dole
*Assistant Examiner* — Carlos Rivera-Perez
(74) *Attorney, Agent, or Firm* — Cooper & Dunham LLP

(57) ABSTRACT

A charge pump circuit which steps down an input voltage inputted from an input terminal and outputs it as a step-down output voltage from a step-down output terminal, and steps up the input voltage and outputs it as a step-up output voltage from a step-up output terminal, includes: a voltage conversion circuit having a flying capacitor, a step-down output capacitor, a step-up output capacitor, and a plurality of switches, wherein the flying capacitor, the step-down output capacitor, the step-up output capacitor, and the switches are connected, and the voltage conversion circuit is capable of switching connection states by switching each on/off state of the switches; an output voltage detection circuit unit which makes a comparison of a voltage between the step-down output voltage and a first predetermined voltage, and makes a comparison of a voltage between the step-up output voltage and a second predetermined voltage, and produces and outputs each signal indicating each result of the comparisons; and a control circuit unit which performs a switching control depending on each signal outputted from the output voltage detection circuit unit.

19 Claims, 5 Drawing Sheets

(56) References Cited

U.S. PATENT DOCUMENTS

| | | |
|---|---|---|
| 2002/0051372 A1 | 5/2002 | Hoshino et al. |
| 2006/0244513 A1* | 11/2006 | Yen et al. .............. 327/536 |
| 2007/0211503 A1 | 9/2007 | Oyama et al. |
| 2008/0150619 A1 | 6/2008 | Lesso et al. |

FOREIGN PATENT DOCUMENTS

| | | |
|---|---|---|
| JP | 5-111243 | 4/1993 |
| JP | 2002-204567 | 7/2002 |
| JP | 2003-528558 | 9/2003 |
| JP | 2007-244078 | 9/2007 |
| JP | 2009-69862 | 4/2009 |
| KR | 10-2007-0092153 | 9/2007 |
| KR | 10-2009-0094153 | 9/2009 |
| WO | WO01/71893 A2 | 9/2001 |

OTHER PUBLICATIONS

Korean official action dated Jun. 11, 2013 in corresponding Korean patent application No. 10-2012-7002711.

* cited by examiner

FIG.7

| Vo1 | Vo2 | FIRST AND SECOND STEP | THIRD STEP | FOURTH STEP |
|---|---|---|---|---|
| L | L | a(S1=ON,S8=ON) | ↑ | ↑ |
| H | L | a(S1=ON,S8=ON) | b(S3=ON,S6=ON,S8=ON) | ↑ |
| L | H | a(S1=ON,S8=ON) | d(S4=ON,S5=ON,S6=ON,S7=ON) | ↑ |
| H | H | a(S1=ON,S8=ON) | b(S3=ON,S6=ON,S8=ON) | c(S2=ON,S4=ON,S7=ON) |

US 8,791,748 B2

CHARGE PUMP CIRCUIT AND OPERATION CONTROL METHOD THEREOF

TECHNICAL FIELD

The present invention relates to a charge pump circuit which produces and outputs a plurality of different voltages, and in particular, a charge pump circuit which respectively produces and outputs a step-down voltage which is smaller than an input voltage and a step-up voltage which is greater than an input voltage, and an operation control method thereof.

BACKGROUND ART

In a first conventional example of a charge pump circuit, a flying capacitor is charged with an input voltage, and an output capacitor which is connected to an output terminal is charged with a voltage in which the input voltage is added to the charged voltage in the flying capacitor, and thereby a voltage which is twice the input voltage is produced (see Japanese patent publication number S56-12859). In the case of producing a greater voltage, a voltage of the flying capacitor which is charged with the input voltage is further added to a voltage of the output terminal which is charged to twice the input voltage, and thereby an output voltage which is three times the input voltage is obtained. By repeating the same operation, it is possible to obtain an output voltage which is N times the input voltage.

Additionally, a second conventional example of a charge pump circuit includes a first switching section which produces a voltage, which is the same as an input voltage, in a first capacitor, and a second switching section which produces a voltage, which is smaller than the input voltage, in a second capacitor (see Japanese patent publication number S61-120933). By combining and connecting each of the first and second capacitors and the input voltage, six kinds of output voltages ranging from a voltage which is smaller than the input voltage to a voltage which is greater than the input voltage are produced.

Moreover, in a third conventional example of a charge pump circuit, one flying capacitor outputs an output voltage which is smaller than an input voltage and an output voltage which is greater than the input voltage (see Japanese patent publication number H05-111243).

However, in the first conventional example, an output voltage becomes a voltage which is N times an input voltage, and a voltage which is smaller than the input voltage can not be produced. And additionally, an arbitrary output voltage other than an integral multiple of the input voltage can not be obtained, either. Moreover, in the first conventional example, when an input voltage fluctuates, an output voltage also fluctuates, and no countermeasures are taken for load fluctuations, and therefore an output voltage is unstable.

In the second conventional example, an output voltage which is smaller than an input voltage can be obtained; however a special capacitor is needed, and two capacitors are needed to obtain a voltage which is greater than the input voltage at the same time. Additionally, as well as the first conventional example, in the second conventional example, an arbitrary output voltage can not be obtained, and an output voltage is also unstable in terms of input voltage fluctuations and load fluctuations.

Additionally, in the third conventional example, one flying capacitor is capable of outputting both an output voltage which is greater than an input voltage and an output voltage which is smaller than the input voltage, and it is also possible to change an output voltage by changing an on-duty cycle of a switch section. However, in the third conventional example, it is not possible to change the on-duty cycle of the switch section for each individual output voltage, and therefore an output voltage which can be controlled is limited to one. Moreover, in the third conventional example, a countermeasure for load fluctuations is not taken, and therefore there is a problem in that an output voltage is unstable. Furthermore, an inductor is needed, and therefore it is difficult to achieve a circuit integration.

SUMMARY OF THE INVENTION

An object of the present invention to solve the above-described problem is to provide a charge pump circuit which is capable of obtaining an output voltage which is smaller than an input voltage and an output voltage which is greater than the input voltage with one flying capacitor at the same time, and is capable of performing settings of both the above output voltages and reducing output voltage fluctuations due to load fluctuations, and an operation control method thereof.

In order to achieve the object, the embodiment of the present invention provides: a charge pump circuit which steps down an input voltage inputted from an input terminal and outputs it as a step-down output voltage from a step-down output terminal, and steps up the input voltage and outputs it as a step-up output voltage from a step-up output terminal, comprising: a voltage conversion circuit including: a flying capacitor which is charged with the input voltage; a step-down output capacitor which is connected between the step-down output terminal and ground; a step-up output capacitor which is connected between the step-up output terminal and ground; and a plurality of switches, wherein the flying capacitor, the step-down output capacitor, the step-up output capacitor, and the switches are connected, and the voltage conversion circuit is capable of switching a first connection state in which the flying capacitor is charged with the input voltage, a second connection state in which the step-down output capacitor is charged with the charged voltage in the flying capacitor, a third connection state in which the step-up output capacitor is charged with a voltage in which the input voltage is added to the charged voltage in the flying capacitor, and a fourth connection state in which the step-up output capacitor is charged with a voltage in which the charged voltage in the flying capacitor is added to the charged voltage in the step-down capacitor by switching each on/off state of the switches; an output voltage detection circuit unit which makes a comparison of a voltage between the step-down output voltage and a first predetermined voltage, and makes a comparison of a voltage between the step-up output voltage and a second predetermined voltage, and produces and outputs each signal indicating each result of the comparisons; and a control circuit unit which performs a switching control for switching between the first connection state, the second connection state, the third connection state, and the fourth connection state depending on each signal outputted from the output voltage detection circuit unit.

Preferably, two clock cycles of a predetermined clock signal are taken as one state, and the one state is divided into four steps from first to fourth steps, and in the first two steps of the four steps, the control circuit unit controls the voltage conversion circuit to be only in the first connection state, and in the last two steps of the four steps, the control circuit unit controls the voltage conversion circuit to be in any one of the first to fourth connection states depending on each signal outputted from the output voltage detection circuit unit.

Preferably, in a case where the step-down output voltage is greater than the first predetermined voltage and the step-up output voltage is greater than the second predetermined voltage, in the one state, the control circuit unit controls the voltage conversion circuit to be only in the first connection state.

Preferably, in a case where the step-down output voltage is less than or equal to the first predetermined voltage and the step-up output voltage is greater than the second predetermined voltage, in the last two steps of the four steps, the control circuit unit controls the voltage conversion circuit to be only in the second connection state.

Preferably, in a case where the step-down output voltage is greater than the first predetermined voltage and the step-up output voltage is less than or equal to the second predetermined voltage, in the last two steps of the four steps, the control circuit unit controls the voltage conversion circuit to be only in the fourth connection state.

Preferably, in a case where the step-down output voltage is less than or equal to the first predetermined voltage and the step-up output voltage is less than or equal to the second predetermined voltage, in the third step, the control circuit unit controls the voltage conversion circuit to be only in the second connection state, and in the fourth step, the control circuit unit controls the voltage conversion circuit to be only in the third connection state.

Preferably, the voltage conversion circuit is further capable of switching to a fifth connection state in which each of the flying capacitor and the step-up output capacitor is charged with the input voltage, and the control circuit unit performs a switching control for switching to the fifth connection state depending on each signal outputted from the output voltage detection circuit unit.

Preferably, immediately after the start of the operation, the control circuit unit performs a soft start operation by performing a switching control for exclusively switching in the order of the first connection state, the fifth connection state, the second connection state, and the third connection state, respectively.

Preferably, immediately after the start of the operation, the control circuit unit performs a soft start operation by performing a switching control for exclusively switching in the order of the fifth connection state, the second connection state, and the third connection state, respectively.

Preferably, the switches include first to eighth switches, the first switch which is connected between the input terminal and one end of the flying capacitor, the second switch which is connected between the input terminal and the other end of the flying capacitor, the third and sixth switches which are connected between one end of the flying capacitor and the step-down output terminal in series, the fourth and seventh switches which are connected between one end of the flying capacitor and the step-up output terminal in series, the fifth switch which is connected between the other end of the flying capacitor and a connection part between the third switch and the sixth switch, and the eighth switch which is connected between the other end of the flying capacitor and ground, and the first connection state is taken as a connection state in which only the first and eighth switches are turned on, and the second connection state is taken as a connection state in which only the third, sixth, and eighth switches are turned on, and the third connection state is taken as a connection state in which only the second, fourth, and seventh switches are turned on, and the fourth connection state is taken as a connection state in which only the fourth, fifth, sixth, and seventh switches are turned on, and the control circuit unit performs a switching control for switching between the first connection state, the second connection state, the third connection state, and the fourth connection state depending on each signal outputted from the output voltage detection circuit unit.

Preferably, the voltage conversion circuit is further capable of switching to a fifth connection state in which each of the flying capacitor and the step-up output capacitor is charged with the input voltage, and the fifth connection state is taken as a connection state in which only the first, fourth, seventh, and eighth switches are turned on, and the control circuit unit performs a switching control for switching between the first connection state, the second connection state, the third connection state, the fourth connection state, and the fifth connection state depending on each signal outputted from the output voltage detection circuit.

Preferably, the output voltage detection circuit unit, includes: a first voltage comparison circuit unit which makes a comparison of a voltage between a step-down proportion voltage which is proportional to the step-down output voltage and a predetermined first reference voltage, and produces a first signal depending on a result of the comparison and outputs the first signal to the control circuit unit, and a second voltage comparison circuit unit which makes a comparison of a voltage between a step-up proportion voltage which is proportional to the step-up output voltage and a predetermined second reference voltage, and produces a second signal depending on a result of the comparison and outputs the second signal to the control circuit unit.

In order to achieve the object, the embodiment of the present invention provides: an operation control method of a charge pump circuit including a flying capacitor which is charged with an input voltage inputted from an input terminal, a step-down output capacitor which is connected between a step-down output terminal and ground, and a step-up output capacitor which is connected between a step-up output terminal and ground, which steps down the input voltage and outputs it as a step-down output voltage from the step-down output terminal, and steps up the input voltage and outputs it as a step-up output voltage from the step-up output terminal, comprising: making a comparison of a voltage between the step-down output voltage and a first predetermined voltage and making a comparison of a voltage between the step-up output voltage and a second predetermined voltage, and performing any one of a first connection operation in which the flying capacitor is charged with the input voltage, a second connection operation in which the step-down output capacitor is charged with the charged voltage in the flying capacitor, a third connection operation in which the step-up output capacitor is charged with a voltage in which the input voltage is added to the charged voltage in the flying capacitor, and a fourth connection operation in which the step-up output capacitor is charged with a voltage in which the charged voltage in the flying capacitor is added to the charged voltage in the step-down output capacitor depending on each result of the comparisons.

Preferably, two clock cycles of a predetermined clock signal are taken as one state, and the one state is divided into four steps from first to fourth steps, and in the first two steps of the four steps, the first connection operation is performed, and in the last two steps of the four steps, any one of the first to fourth connection operations is performed depending on each result of the comparisons.

Preferably, in a case where the step-down output voltage is greater than the first predetermined voltage and the step-up output voltage is greater than the second predetermined voltage, in the one state, the first connection operation is performed.

Preferably, in a case where the step-down output voltage is less than or equal to the first predetermined voltage and the step-up output voltage is greater than the second predetermined voltage, in the last two steps of the four steps, the second connection operation is performed.

Preferably, in a case where the step-down output voltage is greater than the first predetermined voltage and the step-up output voltage is less than or equal to the second predetermined voltage, in the last two steps of the four steps, the fourth connection operation is performed.

Preferably, in a case where the step-down output voltage is less than or equal to the first predetermined voltage and the step-up output voltage is less than or equal to the second predetermined voltage, in the third step, the second connection operation is performed, and in the fourth step, the third connection operation is performed.

Preferably, a fifth connection operation in which each of the flying capacitor and the step-up output capacitor is charged with the input voltage is performed depending on each result of the comparisons.

Preferably, immediately after the start of the operation, a soft start operation is performed in the order of the first connection operation, the fifth connection operation, the second connection operation, and the third connection operation.

Preferably, immediately after the start of the operation, a soft start operation is performed in the order of the fifth connection operation, the second connection operation, and the third connection operation

BRIEF DESCRIPTION OF DRAWINGS

FIG. 7 is a diagram illustrating operation examples of a control circuit 4.

DESCRIPTION OF THE EMBODIMENT

Figure 1:
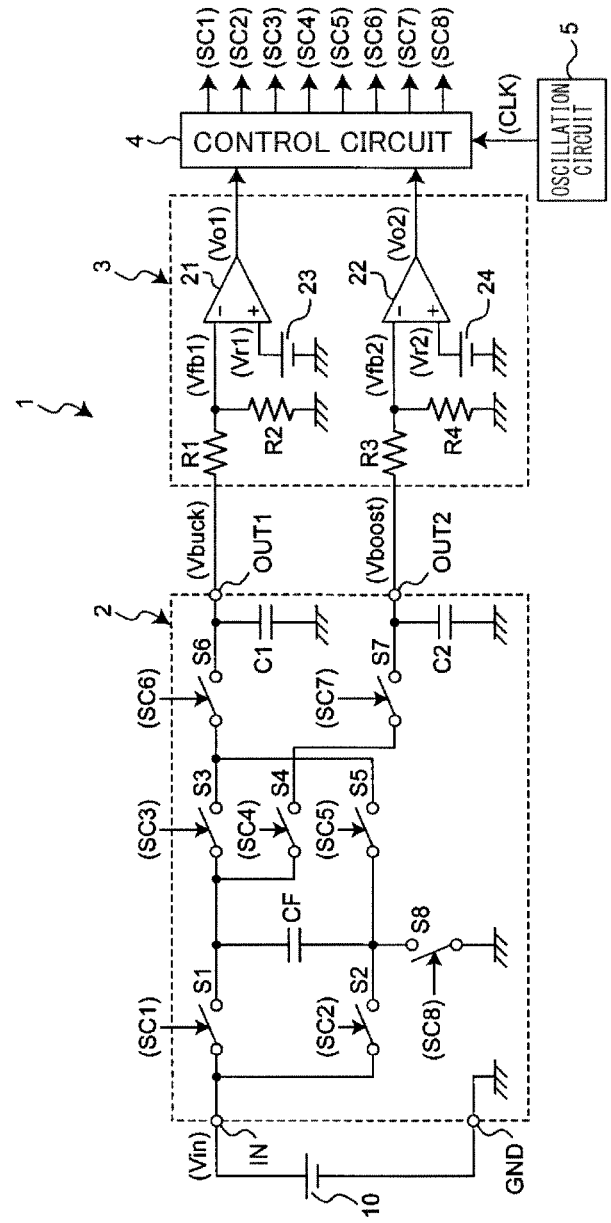
FIG. 1 is a diagram illustrating a circuit example of a charge pump circuit of an embodiment of the present invention.

Next, referring to the drawings, an embodiment of the present invention will be explained in detail.

Embodiment

FIG. 1 is a diagram illustrating a circuit example of a charge pump circuit of an embodiment of the present invention.

A charge pump circuit 1 in FIG. 1 steps down an input voltage Vin which is inputted to an input terminal IN from a battery or a DC (direct current) power supply 10 such as a constant voltage circuit and so on, and produces and outputs a step-down output voltage Vbuck from a step-down output terminal OUT1, and steps up the input voltage Vin and produces and outputs a step-up output voltage Vboost from a step-up output terminal OUT2.

The charge pump circuit 1 includes a voltage conversion circuit 2, an output voltage detection circuit 3, a control circuit 4, and an oscillation circuit 5. The voltage conversion circuit 2 produces a step-down output voltage Vbuck and a step-up output voltage Vboost each from an input voltage Vin, and outputs the step-down output voltage Vbuck from a step-down output terminal OUT1 and outputs the step-up output voltage Vboost from a step-up output terminal OUT2. The output voltage detection circuit 3 performs a detection of each output voltage value which is outputted from the voltage conversion circuit 2. The control circuit 4 performs an operation control of the voltage conversion circuit 2 depending on a detection result of the output voltage detection circuit 3. The oscillation circuit 5 produces and outputs a predetermined clock signal CLK.

The voltage conversion circuit 2 includes switches S1 to S8, a flying capacitor CF, a step-down capacitor C1, and a step-up capacitor C2. The switches S1 to S8 perform a switching operation depending on a control signal which is inputted to a control input.

In addition, the output voltage detection circuit 3 includes comparators 21 and 22, a first reference voltage generation circuit 23, a second reference voltage generation circuit 24, and resistors R1 to R4. The first reference voltage generation circuit 23 generates and outputs a predetermined first reference voltage Vr1. The second reference voltage generation circuit 24 generates and outputs a predetermined second reference voltage Vr2.

An output voltage detection circuit unit includes the output voltage detection circuit 3, and a control circuit unit includes the control circuit 4 and the oscillation circuit 5. A first switch includes the switch S1, a second switch includes the switch S2, a third switch includes the switch S3, a fourth switch includes the switch S4, a fifth switch includes the switch S5, a sixth switch includes the switch S6, a seventh switch includes the switch S7, and an eighth switch includes the switch S8. A first voltage comparison circuit unit includes the comparator 21, the resistors R1 and R2, and the first reference voltage generation circuit 23. A second voltage comparison circuit unit includes the comparator 22, the resistors R3 and R4, and the second reference voltage generation circuit 24.

A positive electrode side terminal of a DC power supply 10 is connected to the input terminal IN and a negative electrode side terminal of the DC power supply 10 is connected to a ground terminal GND.

Hereinafter, as just described, an example in a case where an electric potential of the negative electrode side terminal of the DC power supply 10 is a ground potential will be explained.

Between the input terminal In and the step-down output terminal OUT1, the switches S1, S3 and S6 are connected in series, and a series circuit of the switches S2 and S5 is connected to a series circuit of the switches S1 and S3 in parallel. And between a connection part between the switches S1 and S3 and the step-up voltage terminal OUT2, the switches S4 and S7 are connected in series.

Between the connection part between the switches S1 and S3 and a connection part between the switches S2 and S5, the flying capacitor CF is connected, and between the connection part between the switches S2 and S5 and ground, the switch S8 is connected. And between the step-down output terminal OUT1 and ground, a step-down output capacitor C1 is connected, and between the step-up output terminal OUT2 and ground, a step-up output capacitor C2 is connected.

Between the step-down output terminal OUT1 and ground, the resistors R1 and R2 are connected in series, and a connection part between the resistors R1 and R2 is connected to an inverting input of the comparator 21. The first reference voltage Vr1 is inputted to a non-inverting input of the comparator 21, and an output of the comparator 21 is connected to the control circuit 4. And between the step-up output terminal OUT2 and ground, the resistors R3 and R4 are connected in series, and a connection part between the resistors R3 and R4 is connected to an inverting input of the comparator 22. The second reference voltage Vr2 is inputted to a non-inverting input of the comparator 22, and an output of the comparator 22 is connected to the control circuit 4.

The clock signal CLK is inputted to the control circuit 4. Based on an output signal Vo1 (first signal) of the comparator 21, an output signal Vo2 (second signal) of the comparator 22, and the clock signal CLK, control signals SC1 to SC8 for the switches S1 to S8 respectively are produced and outputted to control inputs of the corresponding switches S1 to S8. And the switches S1 to S8 perform switching operations based on correspondingly inputted control signals SC1 to SC8.

In such a configuration, the resistors R1 and R2 divide the step-down output voltage Vbuck and produces a voltage proportional to the step-down output voltage Vbuck (step-down proportion voltage Vfb1), and the step-down proportion voltage Vfb1 is inputted to the inverting input of the comparator 21. In a case where the step-down proportion voltage Vfb1 is greater than the first reference voltage Vr1, the comparator 21 outputs an output signal Vo1 in a high state, and in a case where the step-down proportion voltage Vfb1 is less than or equal to the first reference voltage Vr1, the comparator 21 outputs an output signal Vo1 in a low state. And the resistors R3 and R4 divide the step-up output voltage Vboost and produce a voltage proportional to the step-up output voltage Vboost (step-up proportion voltage Vfb2), and the step-up proportion voltage Vfb2 is inputted to the inverting input of the comparator 22. In a case where the step-up proportion voltage Vfb2 is greater than the second reference voltage Vr2, the comparator 22 outputs an output signal Vo2 in a high state, and in a case where the step-up proportion voltage Vfb2 is less than or equal to the second reference voltage Vr2, the comparator 22 outputs an output signal Vo2 in a low state. The control circuit 4 performs on/off control of each of the switches S1 to S8 of the voltage conversion circuit 2 based on the inputted clock signal CLK and output signals Vo1 and Vo2.

The switches S1 to S8 of the voltage conversion circuit 2 become five kinds of on/off states, which are connection states "a" to "e" as illustrated in FIGS. 2 to 6, by the control circuit 4.

Figure 2:
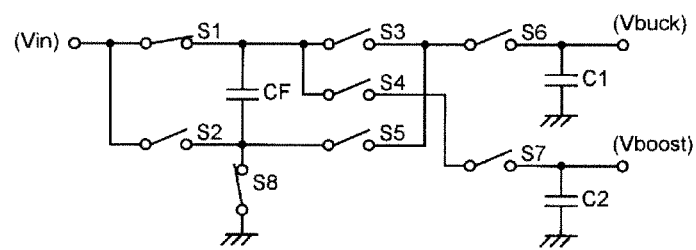
FIG. 2 is a diagram illustrating a connection state "a" in a voltage conversion circuit 2.

FIG. 2 illustrates the connection state "a" (first connection state), and in this case, each of the switches S1 and S8 is turned on and in a conduction state, and each of the switches S2 to S7 is turned off and in a cut-off state, and the flying capacitor CF is charged with the input voltage Vin.

Figure 3:
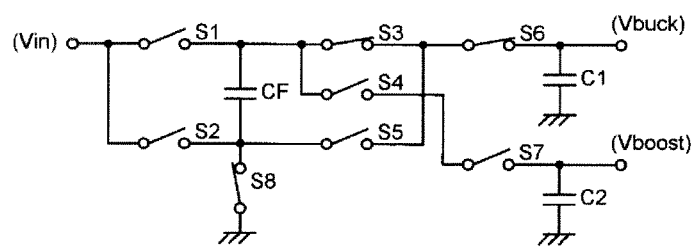
FIG. 3 is a diagram illustrating a connection state "b" in the voltage conversion circuit 2.

FIG. 3 illustrates the connection state "b" (second connection state), and in this case, each of the switches S3, S6, and S8 is turned on and in a conduction state, and each of the switches S1, S2, S4, S5, and S7 is turned off and in a cut-off state, and the step-down output capacitor C1 is charged with the charged voltage in the flying capacitor CF.

Figure 4:
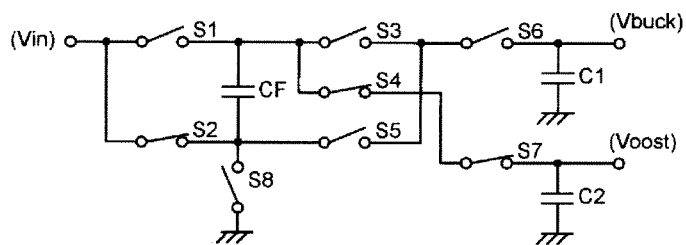
FIG. 4 is a diagram illustrating a connection state "c" in the voltage conversion circuit 2.

FIG. 4 illustrates the connection state "c" (third connection state), and in this case, each of the switches S2, S4, and S7 is turned on and in a conduction state, and each of the switches S1, S3, S5, S6 and S8 is turned off and in a cut-off state, and the step-up output capacitor C2 is charged with a voltage in which the charged voltage in the flying capacitor CF is added to the input voltage Vin.

Figure 5:
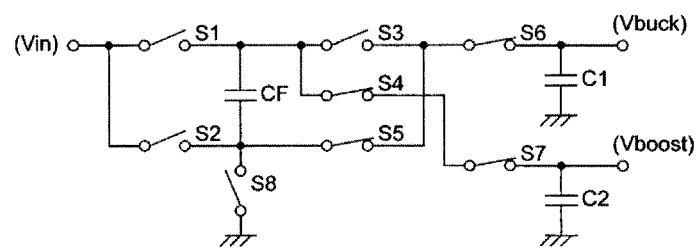
FIG. 5 is a diagram illustrating a connection state "d" in the voltage conversion circuit 2.

FIG. 5 illustrates the connection state "d" (fourth connection state), and in this case, each of the switches S4 to S7 is turned on and in a conduction state, and each of the switches S1 to S3 and S8 is turned off and in a cut-off state, and the step-up output capacitor C2 is charged with a voltage in which the charged voltage in the flying capacitor CF is added to the charged voltage in the step-down output capacitor C1.

Figure 6:
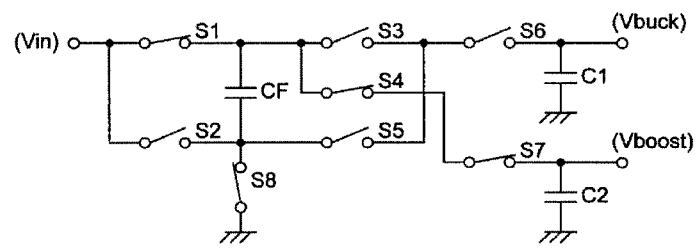
FIG. 6 is a diagram illustrating a connection state "e" in the voltage conversion circuit 2.

FIG. 6 illustrates the connection state "e" (fifth connection state), and in this case, each of the switches S1, S4, S7, and S8 is turned on and in a conduction state, and each of the switches S2, S3, S5, and S6 is turned off and in a cut-off state, and each of the flying capacitor CF and the step-up output capacitor C2 is charged with the input voltage Vin.

Figure 8:
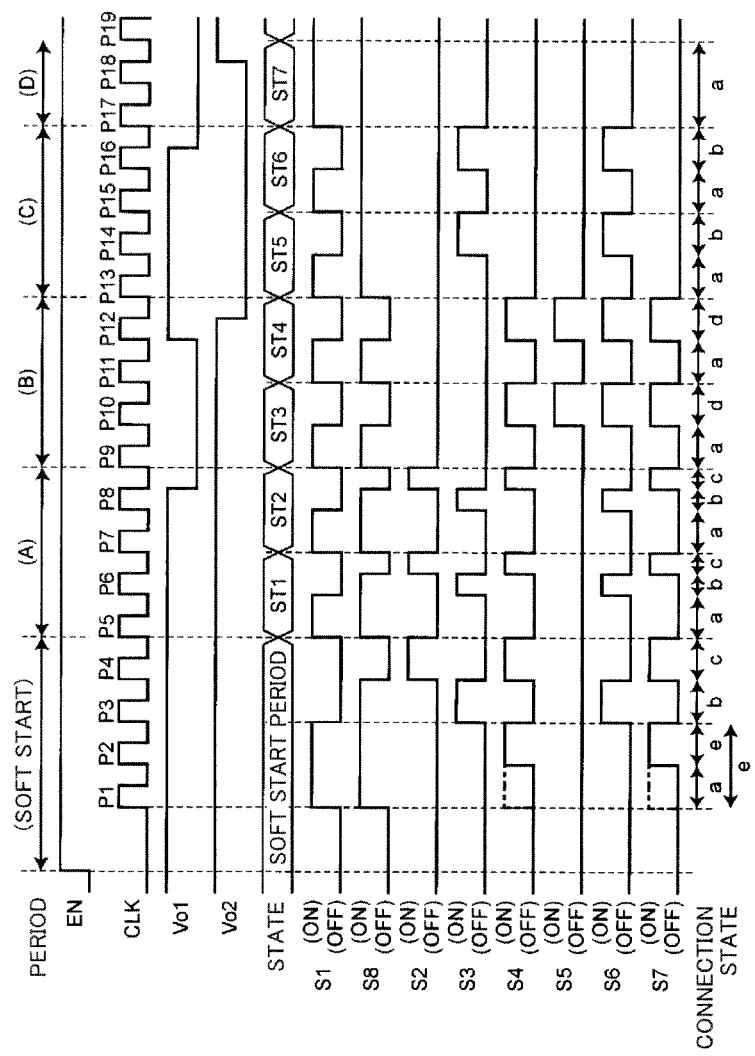
FIG. 8 is a timing diagram illustrating operation examples of a charge pump circuit 1.

Next, FIG. 7 is a diagram illustrating operation examples of the control circuit 4, and FIG. 8 is a timing diagram illustrating operation examples of the charge pump circuit 1. By use of the FIGS. 7 and 8, operation of the charge pump circuit 1 of FIG. 1 will be explained.

As can be seen from FIG. 8, in the operation of the charge pump circuit 1, two clock cycles of the clock signal CLK are taken as one state, and the one state is divided into four steps per half clock cycle of the clock signal CLK.

In a first step of each state, the control circuit 4 confirms each of the states of the output signal Vo1 of the comparator 21 and the output signal Vo2 of the comparators 22, and depending on the state, selects and forms a connection state in each step from a first step to a fourth step from among the connection states "a" to "d" as illustrated in FIG. 7.

In FIG. 7, in a case where each of the output signals Vo1 and Vo2 is in a low state (L), the control circuit 4 controls operations of the switches S1 to S8 to become the connection state "a" from the first step to the fourth step, respectively. A case where the output signals Vo1 and Vo2 are both in a low state indicates that the step-down output voltage Vbuck is greater than the first reference voltage Vr1 and the step-up output voltage Vboost is greater than the second reference voltage Vr2. In this state, the flying capacitor C1 is only charged, and charging of the step-down output capacitor C1 and the step-up output capacitor C2 is not performed.

Next, in a case where the output signal Vo1 is in a high state (H) and the output signal Vo2 is in a low state (L), the control circuit 4 controls the operations of the switches S1 to S8 to become the connection state "a" in the first and second steps, and the flying capacitor CF is charged. And then, in the third and fourth steps, the control circuit 4 controls each of the switches S3, S6, and S8 to turn then on and become the connection state "b". In a case where the output signal Vo1 of the comparator 21 is in a high state and the output signal Vo2 of the comparator 22 is in a low state, the step-down output voltage Vbuck is less than or equal to the first reference voltage Vr1, and the step-up output voltage Vboost is greater than the second reference voltage Vr2. Therefore, in order to raise only the step-down output voltage Vbuck, the step-down output capacitor C1 is charged with the charged voltage in the flying capacitor CF. And the step-up output voltage Vboost is greater than the second reference voltage Vr2, and therefore charging of the step-up output capacitor C2 is not performed.

Next, in a case where the output signal Vo1 is in a low state (L) and the output signal Vo2 is in a high state (H), the control circuit 4 controls the operations of the switches S1 to S8 to become the connection state "a" in the first and second steps, and the flying capacitor CF is charged. And then, in the third and fourth steps, the control circuit 4 controls each of the switches S4 to S7 to turn them on and become the connection state "d". When the output signal Vo1 of the comparator 21 is in a low state and the output signal Vo2 of the comparator 22 is in a high state, the step-down output voltage Vbuck is greater than the first reference voltage Vr1 and the step-up output voltage Vboost is less than or equal to the second reference voltage Vr2. Therefore, in order to raise the step-up output voltage Vboost and lower the step-down output voltage Vbuck, the step-up output capacitor C2 is charged with a voltage in which the voltage of the flying capacitor CF charged with the input voltage Vin is added to the charged voltage in the step-down output capacitor C1. As a result, the step-down output voltage Vbuck lowers, and the step-up output voltage Vboost rises.

Next, in a case where each of the output signals Vo1 and Vo2 is in a high state (H), the control circuit 4 controls the operations of the switches S1 to S8 to become the connection state "a" in the first and second steps, and the flying capacitor CF is charged. And then, in the third step, the control circuit 4 controls each of the switches S3, S6 and S8 to turn them on and become the connection state "b", and in the fourth step, the control circuit 4 controls each of the switches S2, S4, and S7 to turn them on and become the connection state "c". Each of the output signal Vo1 of the comparator 21 and the output signal Vo2 of the comparator 22 being in a high state indicates that the step-down output voltage Vbuck and the step-up output voltage Vboost are less than or equal to the corresponding first reference voltage Vr1 and second reference voltage Vr2. Therefore, in the third step, in order to raise the step-down output voltage Vbuck, the step-down output capacitor C1 is charged with the charged voltage in the flying capacitor CF. And in the fourth step, in order to raise the step-up output voltage Vboost, the step-up output capacitor C2 is charged with a voltage in which the voltage of the flying capacitor CF is added to the input voltage Vin. As a result, each of the step-down output capacitor C1 and the step-up output capacitor C2 are charged.

Next, in FIG. 8, EN, which is not illustrated in FIG. 1, denotes an enable signal for the charge pump circuit 1. When the enable signal EN becomes a high state, the charge pump circuit 1 starts operation. In FIG. 8, reference characters P1 to P19 of the clock signal CLK denote clock pulse numbers for performing an explanation of operation, and STATE denotes each state of the charge pump circuit 1 as described above, and reference characters S1 to S8 denote on/off states of the switches S1 to S8.

When the enable signal EN becomes a high state, the charge pump circuit 1 starts operation, and the clock signal CLK is outputted from the oscillation circuit 5.

Immediately after the start of operation of the charge pump circuit 1, an electrical charge is not accumulated in each of the step-up output capacitor C2 and step-down output capacitor C1, and if the operation of the charge pump circuit 1 is promptly performed, a great inrush current occurs. In order to prevent such a great inrush current occurring, a soft start period is provided.

In the soft start period, firstly, in order to charge the flying capacitor CF with the input voltage Vin, the connection state "a" is formed. After the flying capacitor CF is charged with the input voltage Vin, in order to charge the step-up output capacitor C2 with the input voltage Vin, the connection state "e" is formed.

When the voltage of the step-up output capacitor C2 rises to the input voltage Vin, in order to charge the step-down output capacitor C1, the connection state "b" is formed, and the step-down output capacitor C1 is charged with the flying capacitor CF charged with the input voltage Vin. Next, in order to step up the voltage of the step-up output capacitor C2 to equal to or more than the input voltage Vin, the connection state "c" is formed, and the step-up output capacitor C2 is charged with a voltage in which the input voltage Vin is added to the voltage of the flying capacitor CF in which the voltage is lowered by charging the step-down output capacitor C1.

Thus, in the soft start period, each capacitor is charged stepwisely in turn, and therefore an occurrence of the great inrush current can be inhibited. And if there is sufficient supply in the DC power supply 10, the connection state "e" is formed from the start of the soft start period as described by a dash-dotted line in FIG. 8 and the flying capacitor CF and the step-up output capacitor C2 may be charged at the same time. And in FIG. 8, in order to explain clearly, the soft start period is provided such that a soft start operation is performed between clock pulses P1 and P4; however, in fact, more clock cycles are needed. In addition, each length of the connection states may be changed depending on a power supply capacity of the DC power supply 10, or a capacitance of each of the capacitors CF, C1, and C2, and so on.

Next, from a clock pulse P5 of the clock signal CLK, a normal operation of the charge pump circuit 1 is performed. At a rising edge of the clock pulse P5, a state ST1 starts, and at this time, each of the output signal Vo1 of the comparator 21 and the output signal Vo2 of the comparator 22 is in a high state. That is, in a period A, the step-down output voltage Vbuck and the step-up output voltage Vboost are lower than a first predetermined voltage and a second predetermined voltage, which are target voltages, respectively. Therefore, a connection state of each step is as in the case in FIG. 7 where each of the output signals Vo1 and Vo2 is in a high state. That is, in the first and second steps, the connection state "a" is formed, and in the third step, the connection "b" is formed, and in the fourth step, the connection state "c" is formed, respectively.

Also in a state ST2 starting from a clock pulse P7, each of the output signal Vo1 of the comparator 21 and the output signal Vo2 of the comparator 22 is in a high state. Therefore, the same operation as the state ST1 is performed. However, in the state ST2, at a falling edge of a clock pulse P8, the output signal Vo1 of the comparator 21 changes to a low state, and this indicates that the step-down output voltage Vbuck exceeds the target voltage. In order to explain clearly, it has been explained such that the output signal Vo1 of the comparator 21 is synchronous with the clock signal CLK however, in fact, the output signal Vo1 of the comparator 21 is asynchronous with the clock signal CLK, and the same is true of the following description.

In a state ST3 starting from a clock pulse P9, the output signal Vo1 of the comparator 21 is in a low state and the output signal Vo2 of the comparator 22 is in a high state. That is, a period B is a state where only the step-up output voltage Vboost does not reach the target voltage. Therefore, a connection state of each step becomes as in the case in FIG. 7 where the output signal Vo1 is in a low state and the output signal Vo2 is in a high state. That is, in the state ST3, in the first and second steps, the connection state "a" is formed, and in last third and fourth steps, the connection state "d" is formed.

Also in a state ST4 starting from a clock pulse P11, the output signals Vo1 and Vo2 are in the same states as the above; however, in the state ST4, the output signal Vo1 of the comparator 21 returns to a high state at a rising edge of a clock pulse P12, and the output signal Vo2 of the comparator 22 changes to a low state at a falling edge of the clock pulse P12. Therefore, in a state ST5 starting from a clock pulse P13, a connection state of each step becomes as in the case in FIG. 7 where the output signal Vo1 is in a high state and the output signal Vo2 is in a low state. That is, in the state ST5, in the first and second steps, the connection state "a" is formed, and in the last third and fourth steps, the connection state "b" is formed.

Also in a state ST6 starting from a clock pulse P15, the same operation as the state ST5 is performed; however, in the state ST6, at a falling edge of a clock pulse P16, the output signal Vo1 of the comparator 21 is in a low state. Therefore, in a state ST7 starting from a clock pulse P17, a connection state of each step becomes as in the case in FIG. 7 where each of the output signals Vo1 and Vo2 is in a low state. That is, in the state ST7, in each of the four steps, the connection state "a" is formed, respectively, and charging of the step-down output capacitor C1 and the step-up output capacitor C2 is not performed.

In the above explanation, in the case in FIG. 7 where the output voltage Vo1 is in a low state and the output voltage Vo2 is in a high state, the connection state "d" is formed in the third and fourth steps; however, in a case where a setting value of the step-up output voltage Vboost is large and is equal to or more than a voltage in which the input voltage Vin is added to the step-down output voltage Vbuck, the connection state "c" may be used.

Thus, the charge pump circuit of the embodiment, by use of the step-down proportion voltage Vfb1, the step-up proportion voltage Vfb2, the first reference voltage Vr1, and the second reference voltage Vr2, respectively makes comparisons of voltages between the step-down output voltage Vbuck and the first predetermined voltage, which is a target voltage, and between the step-up output voltage Vboost and the second predetermined voltage, which is a target voltage, and depending on results of the comparisons, charging cycles of the step-down output capacitor C1 and the step-up output capacitor C2 are controlled. And thereby, the step-down output voltage Vbuck is freely settable between 0V and the input voltage Vin, and the step-up output voltage Vboost is settable between the input voltage Vin and a twofold input voltage Vin.

Only one flying capacitor CF is required, and therefore miniaturization of a circuit can be achieved.

In addition, the soft start period is provided and the soft start operation can be performed by only the connection states of the switches of the voltage conversion circuit 2, and therefore it is not necessary to add a new circuit and an increase in size of the circuit can be inhibited.

Moreover, an inductor is not needed, and therefore it is possible to reduce the number of external components in the case of the circuit integration.

According to a charge pump circuit and the operation control method thereof of the embodiment, comparisons of voltages are respectively made between a step-down output voltage and a first predetermined voltage, which is a target voltage, and between a step-up output voltage and a second predetermined voltage, which is a target voltage, and depending on each result of the comparisons, charging cycles of a step-down output capacitor and a step-up output capacitor are controlled. And thereby, the step-down output voltage is freely settable between a ground voltage and an input voltage, and the step-up output voltage is freely settable between the input voltage and a voltage which is twice the input voltage. In addition, only one flying capacitor is required, and therefore it is possible to achieve a miniaturization of a circuit.

Moreover, a period where a soft start operation is performed is provided, and a soft start operation can be performed by only a connection operation by use of switches; therefore it is not necessary to add a new circuit and an increase in size of a circuit can be inhibited.

Furthermore, an inductor is not needed, and therefore it is possible to reduce the number of external components in the case of a circuit integration.

The present application is based on and claims priority from Japanese patent application number 2009-176197, filed Jul. 29, 2009, the disclosure of which is hereby incorporated by reference herein its entirety.

The invention claimed is:

1. A charge pump circuit which steps down an input voltage inputted from an input terminal and outputs it as a step-down output voltage from a step-down output terminal, and steps up the input voltage and outputs it as a step-up output voltage from a step-up output terminal, comprising:
a voltage conversion circuit including:
a flying capacitor which is charged with the input voltage;
a step-down output capacitor which is connected between the step-down output terminal and ground;
a step-up output capacitor which is connected between the step-up output terminal and ground; and
a plurality of switches,
wherein the flying capacitor, the step-down output capacitor, the step-up output capacitor, and the switches are connected, and the voltage conversion circuit is capable of switching a first connection state in which the flying capacitor is charged with the input voltage, a second connection state in which the step-down output capacitor is charged with the charged voltage in the flying capacitor, a third connection state in which the step-up output capacitor is charged with a voltage in which the input voltage is added to the charged voltage in the flying capacitor, and a fourth connection state in which the step-up output capacitor is charged with a voltage in which the charged voltage in the flying capacitor is added to the charged voltage in the step-down capacitor by switching each on/off state of the switches;
an output voltage detection circuit unit which makes a comparison of a voltage between the step-down output voltage and a first predetermined voltage, and makes a comparison of a voltage between the step-up output voltage and a second predetermined voltage, and produces and outputs each signal indicating each result of the comparisons; and
a control circuit unit which performs a switching control for switching between the first connection state, the second connection state, the third connection state, and the fourth connection state depending on each signal outputted from the output voltage detection circuit unit,
wherein two clock cycles of a predetermined clock signal are taken as one state, and the one state is divided into four steps from first to fourth steps, and in the first two steps of the four steps, the control circuit unit controls the voltage conversion circuit to be only in the first connection state, and in the last two steps of the four steps, the control circuit unit controls the voltage conversion circuit to be in any one of the first to fourth connection states depending on each signal outputted from the output voltage detection circuit unit.

2. The charge pump circuit according to claim 1, wherein in a case where the step-down output voltage is greater than the first predetermined voltage and the step-up output voltage is greater than the second predetermined voltage, in the one state, the control circuit unit controls the voltage conversion circuit to be only in the first connection state.

3. The charge pump circuit according to claim 1, wherein in a case where the step-down output voltage is less than or equal to the first predetermined voltage and the step-up output voltage is greater than the second predetermined voltage, in the last two steps of the four steps, the control circuit unit controls the voltage conversion circuit to be only in the second connection state.

4. The charge pump circuit according to claim 1, wherein in a case where the step-down output voltage is greater than the first predetermined voltage and the step-up output voltage is less than or equal to the second predetermined voltage, in the last two steps of the four steps, the control circuit unit controls the voltage conversion circuit to be only in the fourth connection state.

5. The charge pump circuit according to claim 1, wherein in a case where the step-down output voltage is less than or equal to the first predetermined voltage and the step-up output voltage is less than or equal to the second predetermined voltage, in the third step, the control circuit unit controls the voltage conversion circuit to be only in the second connection state, and in the fourth step, the control circuit unit controls the voltage conversion circuit to be only in the third connection state.

6. The charge pump circuit according to claim 1, wherein the voltage conversion circuit is further capable of switching to a fifth connection state in which each of the flying capacitor and the step-up output capacitor is charged with the input voltage, and the control circuit unit performs a switching control for switching to the fifth connection state depending on each signal outputted from the output voltage detection circuit unit.

7. The charge pump circuit according to claim 6, wherein immediately after the start of the operation, the control circuit unit performs a soft start operation by performing a switching control for exclusively switching in the order of the first connection state, the fifth connection state, the second connection state, and the third connection state, respectively.

8. The charge pump circuit according to claim 6, wherein immediately after the start of the operation, the control circuit unit performs a soft start operation by performing a switching control for exclusively switching in the order of the fifth connection state, the second connection state, and the third connection state, respectively.

9. The charge pump circuit according to claim 1, wherein the output voltage detection circuit unit, includes:
 a first voltage comparison circuit unit which makes a comparison of a voltage between a step-down proportion voltage which is proportional to the step-down output voltage and a predetermined first reference voltage, and produces a first signal depending on a result of the comparison and outputs the first signal to the control circuit unit, and
 a second voltage comparison circuit unit which makes a comparison of a voltage between a step-up proportion voltage which is proportional to the step-up output voltage and a predetermined second reference voltage, and produces a second signal depending on a result of the comparison and outputs the second signal to the control circuit unit.

10. A charge pump circuit which steps down an input voltage inputted from an input terminal and outputs it as a step-down output voltage from a step-down output terminal, and steps up the input voltage and outputs it as a step-up output voltage from a step-up output terminal, comprising:
 a voltage conversion circuit including:
 a flying capacitor which is charged with the input voltage;
 a step-down output capacitor which is connected between the step-down output terminal and ground;
 a step-up output capacitor which is connected between the step-up output terminal and ground; and
 a plurality of switches,
 wherein the flying capacitor, the step-down output capacitor, the step-up output capacitor, and the switches are connected, and the voltage conversion circuit is capable of switching a first connection state in which the flying capacitor is charged with the input voltage, a second connection state in which the step-down output capacitor is charged with the charged voltage in the flying capacitor, a third connection state in which the step-up output capacitor is charged with a voltage in which the input voltage is added to the charged voltage in the flying capacitor, and a fourth connection state in which the step-up output capacitor is charged with a voltage in which the charged voltage in the flying capacitor is added to the charged voltage in the step-down capacitor by switching each on/off state of the switches;
 an output voltage detection circuit unit which makes a comparison of a voltage between the step-down output voltage and a first predetermined voltage, and makes a comparison of a voltage between the step-up output voltage and a second predetermined voltage, and produces and outputs each signal indicating each result of the comparisons; and
 a control circuit unit which performs a switching control for switching between the first connection state, the second connection state, the third connection state, and the fourth connection state depending on each signal outputted from the output voltage detection circuit unit,
 wherein the switches include first to eighth switches, the first switch which is connected between the input terminal and one end of the flying capacitor, the second switch which is connected between the input terminal and the other end of the flying capacitor, the third and sixth switches which are connected between one end of the flying capacitor and the step-down output terminal in series, the fourth and seventh switches which are connected between one end of the flying capacitor and the step-up output terminal in series, the fifth switch which is connected between the other end of the flying capacitor and a connection part between the third switch and the sixth switch, and the eighth switch which is connected between the other end of the flying capacitor and ground, and
 the first connection state is taken as a connection state in which only the first and eighth switches are turned on, and the second connection state is taken as a connection state in which only the third, sixth, and eighth switches are turned on, and the third connection state is taken as a connection state in which only the second, fourth, and seventh switches are turned on, and the fourth connection state is ken as a connection state in which only the fourth, fifth, sixth, and seventh switches are turned on, and
 the control circuit unit performs a switching control for switching between the first connection state, the second connection state, the third connection state, and the fourth connection state depending on each signal outputted from the output voltage detection circuit unit.

11. The charge pump circuit according to claim 10, wherein the voltage conversion circuit is further capable of switching to a fifth connection state in which each of the flying capacitor and the step-up output capacitor is charged with the input voltage, and the fifth connection state is taken as a connection state in which only the first, fourth, seventh, and eighth switches are turned on, and the control circuit unit performs a switching control for switching between the first connection state, the second connection state, the third connection state, the fourth connection state, and the fifth connection state depending on each signal outputted from the output voltage detection circuit.

12. An operation control method of a charge pump circuit including a flying capacitor which is charged with an input voltage inputted from an input terminal, a step-down output capacitor which is connected between a step-down output terminal and ground, and a step-up output capacitor which is connected between a step-up output terminal and ground, which steps down the input voltage and outputs it as a step-down output voltage from the step-down output terminal, and steps up the input voltage and outputs it as a step-up output voltage from the step-up output terminal, comprising:

making a comparison of a voltage between the step-down output voltage and a first predetermined voltage and making a comparison of a voltage between the step-up output voltage and a second predetermined voltage, and performing any one of a first connection operation in which the flying capacitor is charged with the input voltage, a second connection operation in which the step-down output capacitor is charged with the charged voltage in the flying capacitor, a third connection operation in which the step-up output capacitor is charged with a voltage in which the input voltage is added to the charged voltage in the flying capacitor, and a fourth connection operation in which the step-up output capacitor is charged with a voltage in which the charged voltage in the flying capacitor is added to the charged voltage in the step-down output capacitor depending on each result of the comparisons, wherein two clock cycles of a predetermined clock signal are taken as one state, and the one state is divided into four steps from first to fourth steps, and in the first two steps of the four steps, the first connection operation is performed, and in the last two steps of the four steps, any one of the first to fourth connection operations is performed depending on each result of the comparisons.

13. The operation control method of the charge pump circuit according to claim 12, wherein in a case where the step-down output voltage is greater than the first predetermined voltage and the step-up output voltage is greater than the second predetermined voltage, in the one state, the first connection operation is performed.

14. The operation control method of the charge pump circuit according to claim 12, wherein in a case where the step-down output voltage is less than or equal to the first predetermined voltage and the step-up output voltage is greater than the second predetermined voltage, in the last two steps of the four steps, the second connection operation is performed.

15. The operation control method of the charge pump circuit according to claim 12, wherein in a case where the step-down output voltage is greater than the first predetermined voltage and the step-up output voltage is less than or equal to the second predetermined voltage, in the last two steps of the four steps, the fourth connection operation is performed.

16. The operation control method of the charge pump circuit according to claim 12, wherein in a case where the step-down output voltage is less than or equal to the first predetermined voltage and the step-up output voltage is less than or equal to the second predetermined voltage, in the third step, the second connection operation is performed, and in the fourth step, the third connection operation is performed.

17. The operation control method of the charge pump circuit according to claim 12, wherein a filth connection operation in which each of the flying capacitor and the step-up output capacitor is charged with the input voltage is performed depending on each result of the comparisons.

18. The operation control method of the charge pump circuit according to claim 17, wherein immediately after the start of the operation, a soft start operation is performed in the order of the first connection operation, the fifth connection operation, the second connection operation, and the third connection operation.

19. The operation control method of the charge pump circuit according to claim 17, wherein immediately after the start of the operation, a soft start operation is performed in the order of the fifth connection operation, the second connection operation, and the third connection operation.

\* \* \* \* \*